US012574256B2

(12) United States Patent
Kim et al.

(10) Patent No.: US 12,574,256 B2
(45) Date of Patent: Mar. 10, 2026

(54) METHOD FOR MUTUALLY ATTESTING SECURITY LEVELS OF ELECTRONIC DEVICES IN MULTI DEVICE ENVIRONMENT

(71) Applicant: Samsung Electronics Co., Ltd., Suwon-si (KR)

(72) Inventors: Bumhan Kim, Suwon-si (KR); Hyewon Park, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 18/532,453

(22) Filed: Dec. 7, 2023

(65) Prior Publication Data

US 2024/0179013 A1     May 30, 2024

Related U.S. Application Data

(63) Continuation of application No. PCT/KR2023/018769, filed on Nov. 21, 2023.

(30) Foreign Application Priority Data

Nov. 29, 2022     (KR) ........................ 10-2022-0163267
Jan. 9, 2023     (KR) ........................ 10-2023-0002705

(51) Int. Cl.
*H04L 9/32*          (2006.01)
*H04L 9/08*          (2006.01)

(52) U.S. Cl.
CPC .......... *H04L 9/3263* (2013.01); *H04L 9/3247* (2013.01); *H04L 9/0869* (2013.01)

(58) Field of Classification Search
None
See application file for complete search history.

(56) References Cited

U.S. PATENT DOCUMENTS 9,503,433 B2    11/2016  Nayshtut et al.
9,768,966 B2     9/2017  Krahn et al.
(Continued)

FOREIGN PATENT DOCUMENTS

KR          10-1894232 B1     9/2018
KR     10-2021-0017083 A     2/2021
(Continued)

OTHER PUBLICATIONS

International Search Report with Written Opinion and English translation dated Feb. 23, 2024; International Appln. No. PCT/KR2023/018769.

*Primary Examiner* — Jeffrey C Pwu
*Assistant Examiner* — Mayasa A. Shaawat
(74) *Attorney, Agent, or Firm* — Jefferson IP Law, LLP

(57)          ABSTRACT

An electronic device is provided. The electronic device includes a communication module for supporting near-field wireless communication, memory, and at least one processor operatively connected to the communication module and the memory. The memory stores one or more programs including instructions that, when executed by the at least one processor, may cause the electronic device to establish near-field wireless communication connection with an external device through the communication module, generate a first private key by using a determined random function, generate a first public key based on the first private key, generate a first certificate including a security level of the electronic device with respect to the first public key, and transmit the generated first certificate to the external device through the communication module.

17 Claims, 10 Drawing Sheets

(56) References Cited

U.S. PATENT DOCUMENTS

| | | | |
|---|---|---|---|
| 11,336,635 B2 | 5/2022 | Park et al. | |
| 11,706,199 B2 | 7/2023 | Kong et al. | |
| 11,750,373 B2 | 9/2023 | Kwon et al. | |
| 2009/0031125 A1 | 1/2009 | Bjorn | |
| 2011/0035604 A1 | 2/2011 | Habraken | |
| 2019/0052468 A1* | 2/2019 | Ngoc-Ai Lu | H04L 9/008 |
| 2019/0305973 A1 | 10/2019 | Dewan | |
| 2021/0067495 A1 | 3/2021 | Yuting et al. | |
| 2022/0286303 A1 | 9/2022 | Woo | |
| 2022/0292203 A1 | 9/2022 | Severns-Williams et al. | |
| 2024/0073031 A1 | 2/2024 | Park et al. | |

FOREIGN PATENT DOCUMENTS

| KR | 10-2021-0060282 A | 5/2021 |
|---|---|---|
| KR | 10-2022-0079192 A | 6/2022 |
| KR | 10-2022-0101429 A | 7/2022 |

\* cited by examiner

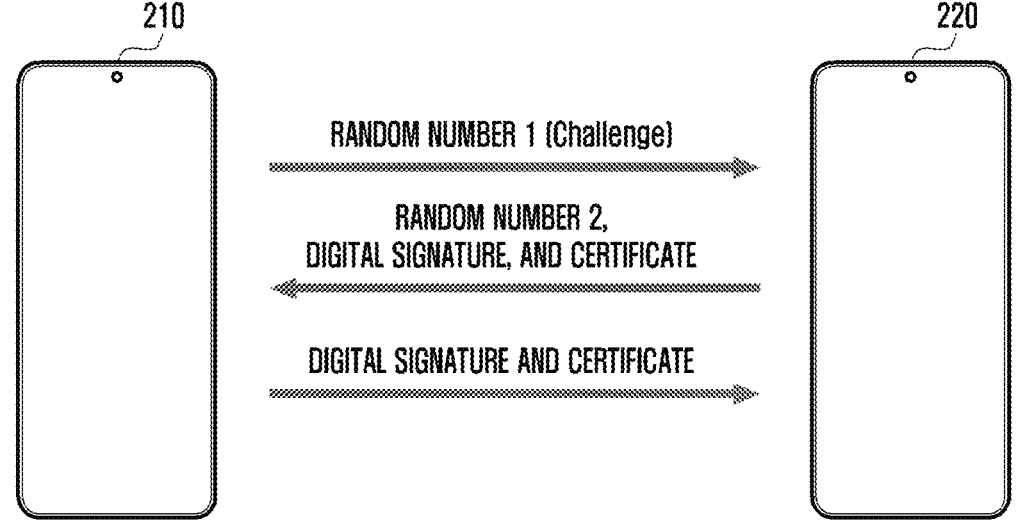

RANDOM NUMBER 1 (Challenge)

RANDOM NUMBER 2,
DIGITAL SIGNATURE, AND CERTIFICATE

DIGITAL SIGNATURE AND CERTIFICATE

Trust Level (L1~L3)
CHILD NODE LIST (IN CASE OF HUB)
WHETHER HW IS MODIFIED
WHETHER SW IS MODIFIED
(MONITOR WHETHER S/W NORMALLY OPERATES)
FIRMWARE (SPL) INFORMATION Trust Level (L1~L3)
CHILD NODE LIST (IN CASE OF HUB)
WHETHER HW IS MODIFIED
WHETHER SW IS MODIFIED
(MONITOR WHETHER S/W NORMALLY OPERATES)
FIRMWARE (SPL) INFORMATION

FIG. 5

METHOD FOR MUTUALLY ATTESTING SECURITY LEVELS OF ELECTRONIC DEVICES IN MULTI DEVICE ENVIRONMENT

CROSS-REFERENCE TO RELATED APPLICATION(S)

This application is a continuation application, claiming priority under § 365(c), of an International application No. PCT/KR2023/018769, filed on Nov. 21, 2023, which is based on and claims the benefit of a Korean patent application number 10-2022-0163267, filed on Nov. 29, 2022, in the Korean Intellectual Property Office, and of a Korean patent application number 10-2023-0002705, filed on Jan. 9, 2023, in the Korean Intellectual Property Office, the disclosure of each of which is incorporated by reference herein in its entirety.

TECHNICAL FIELD

The disclosure relates to an electronic device. More particularly, the disclosure relates to a method for mutually attesting security levels of respective electronic devices in a multi-device environment including multiple electronic devices.

BACKGROUND ART

Device attestation is a method for attesting that hardware and/or software of a specific electronic device (or a terminal) is not changed. For example, in case that an electronic device disguises itself as another electronic device by transferring an identifier (ID) different from a hardware ID initially configured or hardware and/or software is changed after the electronic device is manufactured, the disguising or change is identified through the device attestation. Various services may require the device attestation. For example, when using a service providing one item for a specific electronic device, an electronic device not eligible for the service may duplicate and use identification information (e.g., international mobile equipment identity (IMEI)) of another electronic device, and this unauthorized duplication may be identified through the device attestation. For another example, in the case of an electronic device having authority to process confidential data, a high level of security is required and identification of hardware and software changes may be required prior to accessing data in this case.

For the device attestation in various environments, server-based device attestation is utilized in a communication environment between an electronic device and a server. For example, a key for device attestation is injected to the electronic device, an attestation certificate is issued, and then the server may perform device attestation of the electronic device based on a response of the electronic device with respect to a challenge transmitted by the server.

The above information is presented as background information only to assist with an understanding of the disclosure. No determination has been made, and no assertion is made, as to whether any of the above might be applicable as prior art with regard to the disclosure.

DISCLOSURE OF INVENTION

As various services are provided, a multi-device environment in which an electronic device is connected to another electronic device without interference of a server may be required. In this multi-device environment, it is not enough for one electronic device to verify another electronic device, both electronic devices need to be able to verify the other electronic device, and an exchange of keys to be used for communication between both electronic devices may be necessary after verification. In addition, depending on a service to be provided, a device attestation method for an electronic device to identify and verify information such as a security level of another electronic device may be required.

Aspects of the disclosure are to address at least the above-mentioned problems and/or disadvantages and to provide at least the advantages described below. Accordingly, an aspect of the disclosure is to provide an electronic device and a method for mutually attesting security levels of respective electronic devices in a multi-device environment including multiple electronic devices.

Additional aspects will be set forth in part in the description which follows and, in part, will be apparent from the description, or may be learned by practice of the presented embodiments.

In accordance with an aspect of the disclosure, an electronic device is provided. The electronic device may include a communication module for supporting near-field wireless communication, memory, and at least one processor operatively connected to the communication module and the memory. According to various embodiments, the memory stores one or more programs including instructions that, when executed by the at least one processor, cause the electronic device to establish near-field wireless communication connection with an external device through the communication module, generate a first private key by using a determined random function, generate a first public key based on the first private key, generate a first certificate including a security level of the electronic device with respect to the first public key, and transmit the generated first certificate to the external device through the communication module.

In accordance with another aspect of the disclosure, a method, performed by an electronic device, to mutually attest a security level of an external device is provided. The method may include an operation of establishing near-field wireless communication connection with the external device, an operation of generating a first private key by using a determined random function, an operation of generating a first public key based on the first private key, an operation of generating a first certificate including a security level of the electronic device with respect to the first public key, and an operation of transmitting the generated first certificate to the external device.

In accordance with yet another aspect of the disclosure, one or more non-transitory computer-readable storage media is provided. The one or more non-transitory computer-readable storage media store one or more programs including instructions that, when executed by at least one processor of an electronic device, may cause the electronic device to perform operations. The operations may include establishing near-field wireless communication connection with an external device, generating a first private key by using a determined random function, generating a first public key based on the first private key, generating a first certificate including a security level of the electronic device with respect to the first public key, and transmitting the generated first certificate to the external device.

Various embodiments of the disclosure may provide a method for electronic devices to mutually attest security levels in a multi-device environment, which may perform verification, including the integrity of hardware and/or software of the other device, and identify and verify device information such as a security level between both electronic devices through mutual attestation in a multi-device environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

FIG. 2 is a diagram illustrating a method for mutual attestation between electronic devices in a multi-device environment according to an embodiment of the disclosure;

FIG. 5 is a signal flowchart illustrating a protocol for mutual attestation between electronic devices according to an embodiment of the disclosure;

Throughout the drawings, it should be noted that like reference numbers are used to depict the same or similar elements, features, and structures.

MODE FOR THE INVENTION

Figure 3:
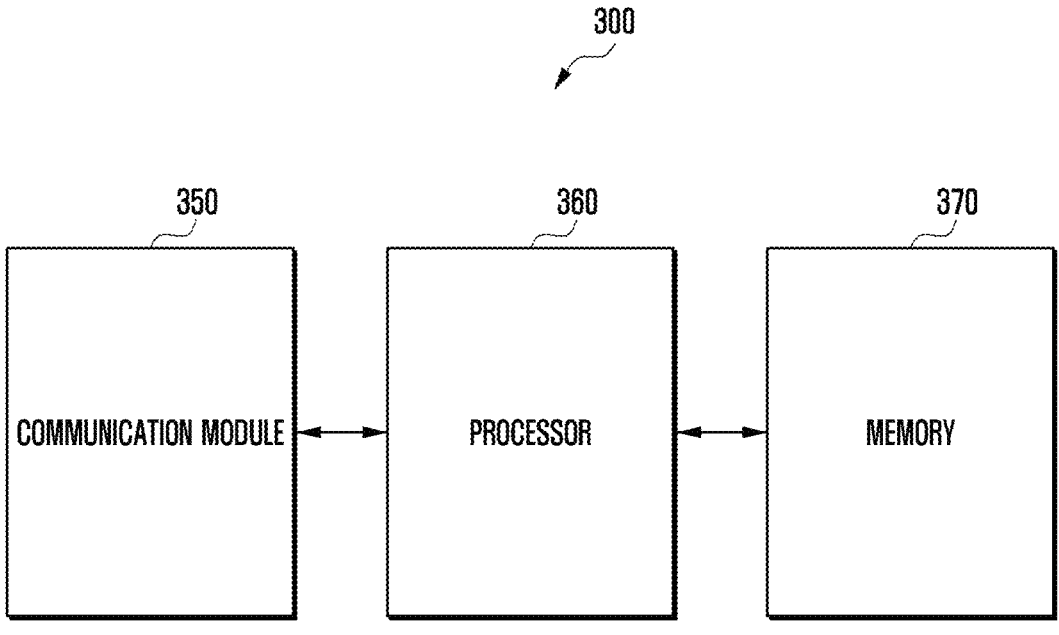
FIG. 3 is a block diagram illustrating an electronic device according to an embodiment of the disclosure.

The following description with reference to the accompanying drawings is provided to assist in a comprehensive understanding of various embodiments of the disclosure defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
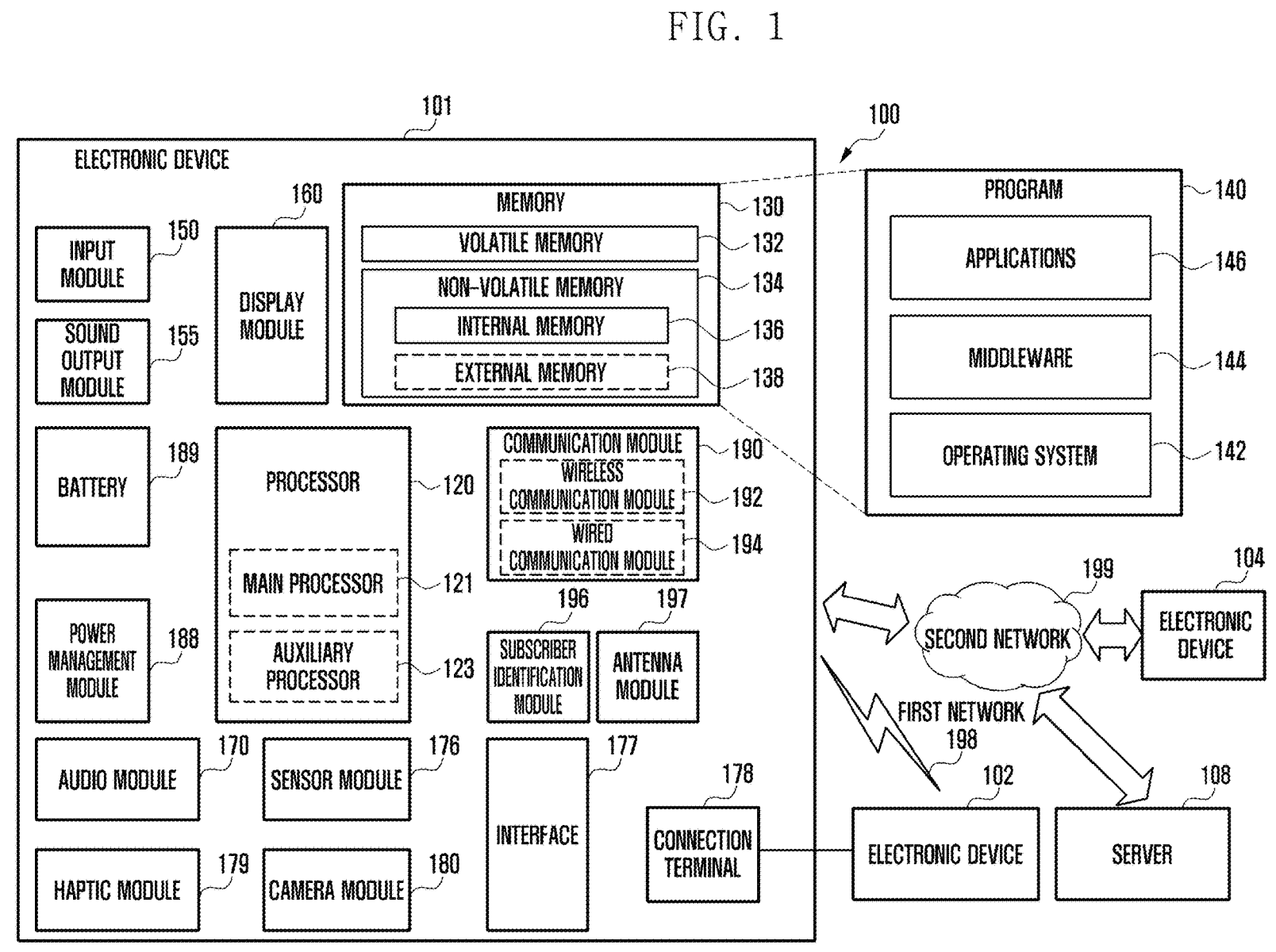

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a diagram illustrating a method for mutual attestation between electronic devices in a multi-device environment according to an embodiment of the disclosure.

A first electronic device 210 and a second electronic device 220 in FIG. 2 may include at least a portion of the structure and/or function of the electronic device 101 in FIG. 1 and the electronic device 300 in FIG. 3, respectively.

According to an embodiment, the first electronic device 210 and the second electronic device 220 may store an attestation key, and the attestation key may include a key (e.g., a Samsung attestation key (SAK)) injected by a manufacturer of the first electronic device 210 and the second electronic device 220. For example, the attestation key may be stored in a non-volatile area of a memory in a manufacturing process of the first electronic device 210 and the second electronic device 220. According to an embodiment, the attestation key may include a private key used in a public key cryptosystem such as an elliptic curve digital signature algorithm (ECDSA), an Edwards curve digital signature algorithm (EdDDSA), and an RSA or a post-quantum cryptography (PQC) cryptosystem and a certificate for the private key.

According to an embodiment, the first electronic device 210 and the second electronic device 220 may perform mutual attestation of the other device based on the stored attestation key. For example, the first electronic device 210 and the second electronic device 220 may identify, through the mutual attestation, whether the other electronic device is manufactured by the same manufacturer and hardware and/or software is modified.

According to an embodiment, the first electronic device 210 and the second electronic device 220 may discover the other device through near-field wireless communication (e.g., Wi-Fi or Bluetooth) and establish connection. In case that a device attestation operation for the other device is triggered in the first electronic device 210 or the second electronic device 220, data may be transmitted and received through established near-field wireless communication.

According to an embodiment, the first electronic device 210 may generate a first random number and transmit the first random number to the second electronic device 220. According to an embodiment, the first electronic device 210 may generate the first random number by using a predetermined random function and combine the generated first random number and an elliptic curve point to generate a first public element required to generate a session key (or symmetric key), and transmit the session key to the second electronic device 220.

According to an embodiment, the second electronic device 220 may generate a second random number, an electronic signature, and a certificate. According to an embodiment, the second electronic device 220 may generate the second random number by using a predetermined secure random function and combine the generated second random number and an elliptic curve point to generate a first public element required to generate a session key (or symmetric key). In addition, the second electronic device 220 may electronically sign the second public element by using the private key, generate a second electronic signature, and generate a second certificate with respect to the public key. The second electronic device 220 may transmit the generated second random number, the electronic signature, and the certificate to the first electronic device 210.

According to an embodiment, the first electronic device 210 may generate an electronic signature and a certificate. According to an embodiment, the first electronic device 210 may electronically sign the first public element by using the private key, generate a first electronic signature, and generate a first certificate with respect to the public key. The first electronic device 210 may transmit the generated electronic signature, and the certificate to the second electronic device 220.

According to an embodiment, based on the second random number, the electronic signature, and the certificate received from the second electronic device 220, the first electronic device 210 may attest the second electronic device 220.

According to an embodiment, the first electronic device 210 may identify an attestation result of the second electronic device 220, a security level (e.g., L1, L2, or L3) of the second electronic device 220, a child node list, whether hardware has been modified, whether software has been modified, and/or firmware information.

According to an embodiment, based on the first random number, the electronic signature, and the certificate received from the first electronic device 210, the second electronic device 220 may attest the first electronic device 210.

According to an embodiment, the second electronic device 220 may identify an attestation result of the first electronic device 210, a security level (e.g., L1, L2, or L3) of the first electronic device 210, a child node list, whether hardware has been modified, whether software has been modified, and/or firmware information.

FIG. 2 illustrates a mutual attestation procedure in the case that after the first electronic device 210 and the second electronic device 220 establish wireless connection, the first electronic device 210 transmits the first random number to the second electronic device 220 first, but the order is not limited thereto. According to an embodiment, after wireless connection establishment, the second electronic device 220 may transmit the second random number to the first electronic device 210 first. In this case, the first electronic device 210 may transmit the first random number, the digital signature, and the certificate to the second electronic device 220 in response to the reception of the second random number, and the second electronic device 220 may transmit the digital signature and the certificate to the first electronic device 210. In this embodiment, the method of the first electronic device 210 and the second electronic device 220 to attest the other device may be identical to the method described with reference to the above embodiment.

FIG. 3 is a block diagram illustrating an electronic device according to an embodiment of the disclosure.

Referring to FIG. 3, the electronic device 300 according to various embodiments may include a communication module 350, a processor 360, and memory 370, and even if some of the components are omitted or substituted with others, various embodiments of the disclosure may be implemented. The electronic device may further include at least a portion of the structure and/or function of the electronic device 101 in FIG. 1 and the first electronic device 210 or the second electronic device 220 in FIG. 2.

According to an embodiment, the communication module 350 may support near-field wireless communication. The communication module 350 may support establishment of a wireless communication channel with an external device (e.g., the second electronic device 220 in FIG. 2) and transmission/reception of data through the established communication channel. There is no fixed type of near-field wireless communication supported by the communication module 350, but for example, at least one of Wi-Fi, Bluetooth, and Bluetooth low energy (BLE) may be supported. The communication module 350 may further include at least a portion of the structure or function of the communication module 190 in FIG. 1.

According to an embodiment, the memory 370 may include one or more computer-readable storage media. The computer-readable storage media are, for example, tangible and non-transitory. The memory 370 includes a well-known volatile memory and non-volatile memory. The memory 370 may store various instructions (e.g., for performing aspects of operations described herein) executable by the processor 360. The instructions may include control commands, such as arithmetic and logic operations, data movement, and input/output, which may be recognized by the processor 360. The memory 360 may be distributed among different types of memory, with any given type being a singular or plural memory. Different memory may be used by, or associated with, a different at least one of one or more processors. The memory 370 may include at least a portion of the structure and/or function of the memory 130 in FIG. 1 and may store at least a portion of the program 140 in FIG. 1.

According to an embodiment, the processor 360 corresponds to a component capable of performing calculation or data processing for control and/or communication of each component of the electronic device 300 and may include at least a portion of components of the processor 120 in FIG. 1. The processor 360 may be operatively, electrically, and/or functionally connected to internal components of the electronic device 300, such as the communication module 350 or the memory 370. According to an embodiment, the processor 360 serves to execute various instructions of one or more programs that may be loaded into memory to perform various operations of the electronic device 300 and to process data. The processor 360 may be a set of one or more processors or may be a multi-processor core, depending on the particular implementation. Here the set of one or more processors may include one or more of an application processor (e.g. a central processing unit (CPU)), a communication processor (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, or the like. The electronic device 300 may perform operations based collectively on different processors of the one or more processors executing different instructions of the one or more programs. Further, the processor 360 may be implemented using one or more heterogeneous processor systems in which a main processor is present with secondary processors on a single chip. As another illustrative example, the processor 360 may be a symmetric multi-processor system containing multiple processors of the same type.

There are no limitations to a calculation and data processing function that the processor 360 may implement within the electronic device 300, and in the disclosure, a description will be given of various embodiments for performing certification, including integrity of hardware and/or software through mutual attestation in a multi-device environment and identifying and verifying device information, such as a security level of an external device.

According to an embodiment, at least a portion of operations of the processor 360 described below may include an operation of an application processor, a secure processor, or a secure element. The secure processor may be implemented in a secure area independent from a normal area of the application processor. For example, the secure processor may be packaged inside the processor 360 and may correspond to a secure chip implemented in an area physically separated from a normal area. The secure processor may include a separate central processing unit (CPU) and random-access memory (RAM) and may provide a security level in hardware level therethrough. The secure element may correspond to a secure chip mounted outside the application processor. The secure element may include an internal processor (or CPU), a volatile memory (e.g., a RAM), and a non-volatile memory, which operate independently from the application processor.

According to an embodiment, the processor 360 (or secure processor, or secure element) may execute a trusted application. The trusted application (TA) may include an application executed in a secure environment. For example, the trusted application may have an access authority to security data and may need to be executed in a secure area (secure world) distinguished from the normal area (normal world).

According to an embodiment, the security level of the electronic device 300 may be determined based on a hardware configuration (e.g., the processor 360, the secure processor, or the secure element) in which the trusted application is executed, or an attestation key generated in the electronic device 300 and a storage location of a certificate for the attestation key. For example, in case that the trusted application is executed on security-specific hardware (e.g., the secure processor) configured inside the processor 360 or on security-specific hardware (e.g., the secure element) configured outside the processor 360, the security level of the electronic device 300 may be determined as a first level (or L1). In addition, in case that the trusted application is executed in a partial area (e.g., a trustzone) of the processor 360, the security level of the electronic device 300 may be determined as a second level (or L2).

The secure area may be realized in various forms in the electronic device 300 and an example of the secure area realized in the electronic device 300 and the security level thereof will be described in detail with reference to FIGS. 4A to 4D.

According to an embodiment, in an environment including multiple devices, the electronic device 300 (e.g., the first electronic device 210 in FIG. 2) and the external device (e.g., the second electronic device 220 in FIG. 2) may identify the security level of the other through mutual attestation and provide a service appropriate for the security level. Here, the security level may be determined based on a level of security provided by an execution environment that provides a critical service and a key protection environment on each device. In addition, the security level may be determined based on a hardware specification and software loading level at the time of manufacturing of the electronic device 300. The security level information may be loaded inside a certificate and/or inside security environment software when the certificate is injected in the manufacturing process of the electronic device 300.

The security level for a security environment of each device may be defined as shown in Table 1 below.

TABLE 1

| Security level | Security strength | Part | | |
|---|---|---|---|---|
| | | Encryption key protection method | Device state management | Membership management |
| L1 | Very high | Security-specific chip mounted | Showing state of connected device and storing security-related data of device | Network joining/leaving management authority for connected device |
| L2 | High | Security function mounted in processor | | No authority |

TABLE 1-continued

| | | | Part | |
| --- | --- | --- | --- | --- |
| Security level | Security strength | Encryption key protection method | Device state management | Membership management |
| L3 | Intermediate | Software security | Only including function of uploading own data | |

According to Table 1 above, it may be defined as the highest security level in the order of L1-L2-L3. In case that the electronic device 300 has a security-specific chip mounted therein, the security level of L1 may be assigned. In this case, an attestation key (e.g., a Samsung attestation key (SAK)) used for attestation of the electronic device 300 may be protected by the corresponding security-specific chip. In addition, an operation for a mutual attestation protocol to be described with reference to FIGS. 5 and 6 may be implemented in association with the security function of the inside of the security-specific chip or the processor 360.

According to an embodiment, in case that the electronic device 300 has a security function inside the processor 360, such as an advanced RISC machine (ARM) trustzone, a security level of L2 may be assigned. In case of a device of L2 level, an intermediate level of security (or capacity) for protecting software based on hardware may be provided. The attestation key and security function of the electronic device 300 of L2 level may be implemented by a security function inside the processor 360.

According to an embodiment, in case that the electronic device 300 does not provide a hardware security function, a security level of L3 may be assigned. In case of the electronic device 300 of L3 level, because of restrictions on key protection, only a relatively low level of authority may be provided.

Hereinafter, a protocol operation of the electronic device 300 (e.g., the first electronic device 210 in FIG. 2) and the external device (e.g., the second electronic device 220 in FIG. 2) for mutual attestation will be described.

According to an embodiment, the processor 360 may generate a first private key by using a determined random function. For example, the processor 360 may generate the first private key by using a cryptographically secure random function.

According to an embodiment, the processor 360 may generate a first public key based on the first private key. According to an embodiment, the processor 360 may generate the first public key in an elliptic curve cryptography (ECC) manner, and for example, the generated first public key may be a value calculated by combining (or multiplying) the private key and an elliptic curve point.

According to an embodiment, the processor 360 may encrypt a key pair of the first private key and first public key, and store same in the non-volatile area of the memory 370.

According to an embodiment, the processor 360 may generate a first random number by using a predetermined secure random function and generate a first public element from the first random number by using an encryption algorithm. For example, the processor 360 may combine (or multiply) the generated first random number and an elliptic curve point to generate the first public element required to generate a session key (or symmetric key). The processor 360 may electrically sign the first public element by using the first private key to generate a first electronic signature.

According to an embodiment, the processor 360 may generate a first certificate for the first public key including the security level of the electronic device 300. According to an embodiment, the first certificate may include at least a portion of the security level, account information, firmware version, software modification, device type, or list of child nodes of the electronic device 300.

According to an embodiment, the processor 360 may transmit, to the external device, an attestation request including at least one piece of generated data (e.g., the first public element, the first electronic signature, and the first certificate).

According to an embodiment, the processor 360 may receive, from the external device (e.g., the second electronic device in FIG. 2), an attestation request including a second public element, a second electronic signature, and a second certificate. According to an embodiment, the external device may generate the second public element, the second electronic signature, and the second certificate in substantially the same manner by which the electronic device 300 generates the first public element, the first electronic signature, and the first certificate.

According to an embodiment, the processor 360 may verify the received second certificate by using a root key prestored in the memory 370. The root key may be injected to the non-volatile area of the memory 330 during the manufacturing of the electronic device 300. According to an embodiment, the processor 360 may verify the second electronic signature by using the second public key built into the second certificate.

According to an embodiment, the processor 360 may identify the security level of the external device included in the second certificate. According to an embodiment, depending on a configuration (e.g., FIGS. 4A to 4D) of the external device, the security level (or trust level) of the external device may be determined and the security level may be one of L1, L2, or L3. The security level of the external device may be stored during the manufacturing procedure of the external device and included in the second certificate generated by the external device. According to an embodiment, the second certificate acquired from the external device may further include at least one of at least a portion of account information of the external device (e.g., an account ID for accessing a service of the manufacturer of the external device), a firmware version, whether the software has been modified (integrity), a device type (e.g., whether the device has a child node in the IoT system, such as an IoT hub), a list of child nodes (e.g., a list of IoT devices connected to an IoT hub), the security level of the child nodes, or firmware information.

According to an embodiment, the processor 360 may provide an authority of the external device on a network including the electronic device 300 and the external device, based on the identified security level of the external device. For example, in case that the external device is identified to have the security level of L1, there may be provided an authority to determine addition of membership when configuring the network including the electronic device 300 and the external device and an authority to monitor network security. In case that the external device is identified to have the security level of L2, the external device may be provided with an authority to that allows only monitoring of network security.

According to an embodiment, the processor 360 may store the identified security level of the external device in a public area of the memory 370.

According to an embodiment, the electronic device 300 may verify a proof of knowledge using the electronic signature through direct attestation with the external device as well as the security level of the other device so as to provide a service appropriate thereto.

FIGS. 4A, 4B, 4C, and 4D are diagrams illustrating a security level of an electronic device according to various embodiments of the disclosure.

According to an embodiment, in an environment including multiple devices, a first electronic device (e.g., the first electronic device 210 in FIG. 2) and a second electronic device (e.g., the second electronic device 220 in FIG. 2) may identify the security level of the other device through mutual attestation and provide a service appropriate for the security level. FIGS. 4A to 4D illustrate an example of a security level assigned according to a configuration of hardware and software included in a security environment of each electronic device. The electronic device (e.g., the electronic device 300 in FIG. 3) may be realized as one of electronic devices 410, 430, 450, and 470 in FIGS. 4A to 4D.

According to an embodiment, a trusted application (TA) 411, 431, 451, or 471 may be an application executed in the security environment. For example, the trusted application 411, 431, 451, or 471 may have an access authority to security data and may need to be executed in a secure area (secure world) distinguished from the normal area (normal world). As shown in FIGS. 4A to 4D, the trusted application 411, 431, 451, or 471 may be executed in a different configuration (e.g., a processor 412, a secure processor 433, or a secure element 454 or 474) depending on the security environment of the electronic device. The security level may be determined according to an execution position of the trusted application 411, 431, 451, or 471 and/or a storage position of a key and certificate on the electronic device and, for example, security levels may be sequentially divided into L1, L2, and L3, which are sequentially higher levels of security.

Figure 4A:
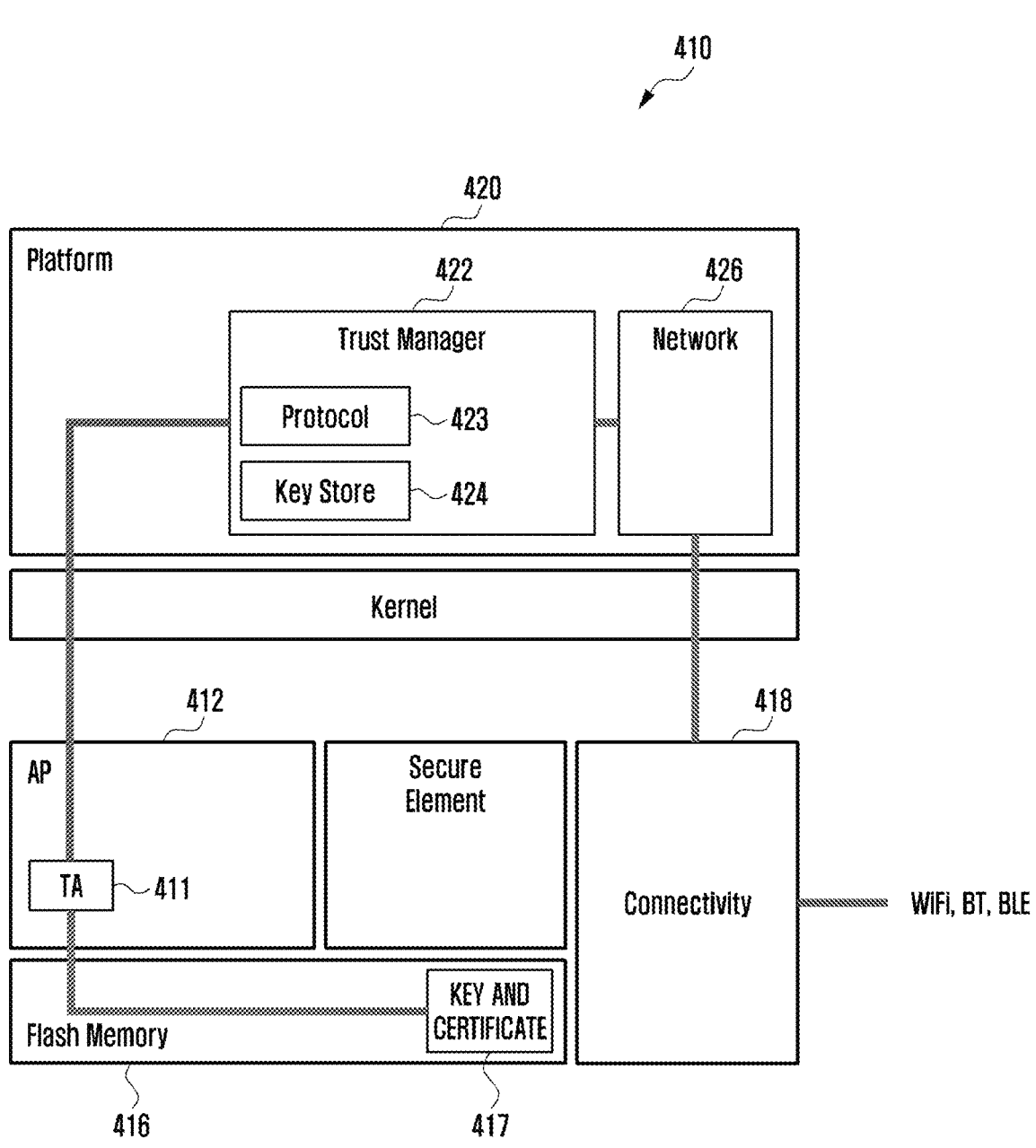
FIGS. 4A, 4B, 4C, and 4D are diagrams illustrating a security level of an electronic device according to various embodiments of the disclosure.

FIG. 4A illustrates an example of executing the trusted application 411 in the security environment within the processor 412.

Referring to FIG. 4A, the electronic device 410 may include a platform 420, a kernel, the processor 412, a secure element, a flash memory 416, and a connectivity module 418.

According to an embodiment, the platform 420 may include a software framework and a hardware architecture for driving various software and may be implemented as, for example, an android platform.

According to an embodiment, the connectivity module 418 may include a communication module for supporting near-field wireless communication, such as Wi-Fi and Bluetooth provided by the platform 420 (or operation system).

According to an embodiment, a trust manager 422 and a network module 426 may be implemented on the platform 420. The network module 426 corresponds to a network stack provided by the platform 420 (or operation system)

and may control transmission and reception of near-field wireless communication data through the connectivity module 418.

According to an embodiment, the trust manager 422 may correspond to a module for performing an operation associated with device-to-device attestation between the electronic device 410 and the external device. The trust manager 422 may be positioned between the security environment (e.g., the trust zone of the processor 412) and the network module 426, and may perform a function of processing data generated in the security environment and transmitting same to the outside or parsing a message received from the network module 426 and transferring same to the security environment.

According to an embodiment, the trust manager 422 may include a protocol module 423 and a key store module 424. The protocol module 423 may include a module defining and implementing an inter-device communication protocol standard. The key store module 424 may include a module processing management of key used for an electronic signature and a certificate.

According to an embodiment, a key and certificate 417 generated in the trusted application 411 may be stored in the flash memory 416. For example, the key and certificate 417 may be encrypted in the security environment inside the processor 412 and stored in an area of the flash memory 416.

According to an embodiment, the trusted application 411 may be executed on the processor 412. The embodiment of FIG. 4A may show a trusted execution environment (TEE) implemented inside an application and a software execution environment protected by hardware. The embodiment is an example in which a trustzone is used in the security environment, and since the trustzone does not support a separated storage (or a non-volatile memory), a key may be encrypted through the trustzone and then stored on a normal area of the flash memory 416.

In the embodiment of FIG. 4A, the trusted application 411 is not executed by separate security-specific hardware, and thus a security level of L2 may be provided. The embodiment is applicable to various devices supporting a security environment, such as the ARM trustzone, thus showing an advantage of high scalability.

Figure 4B:
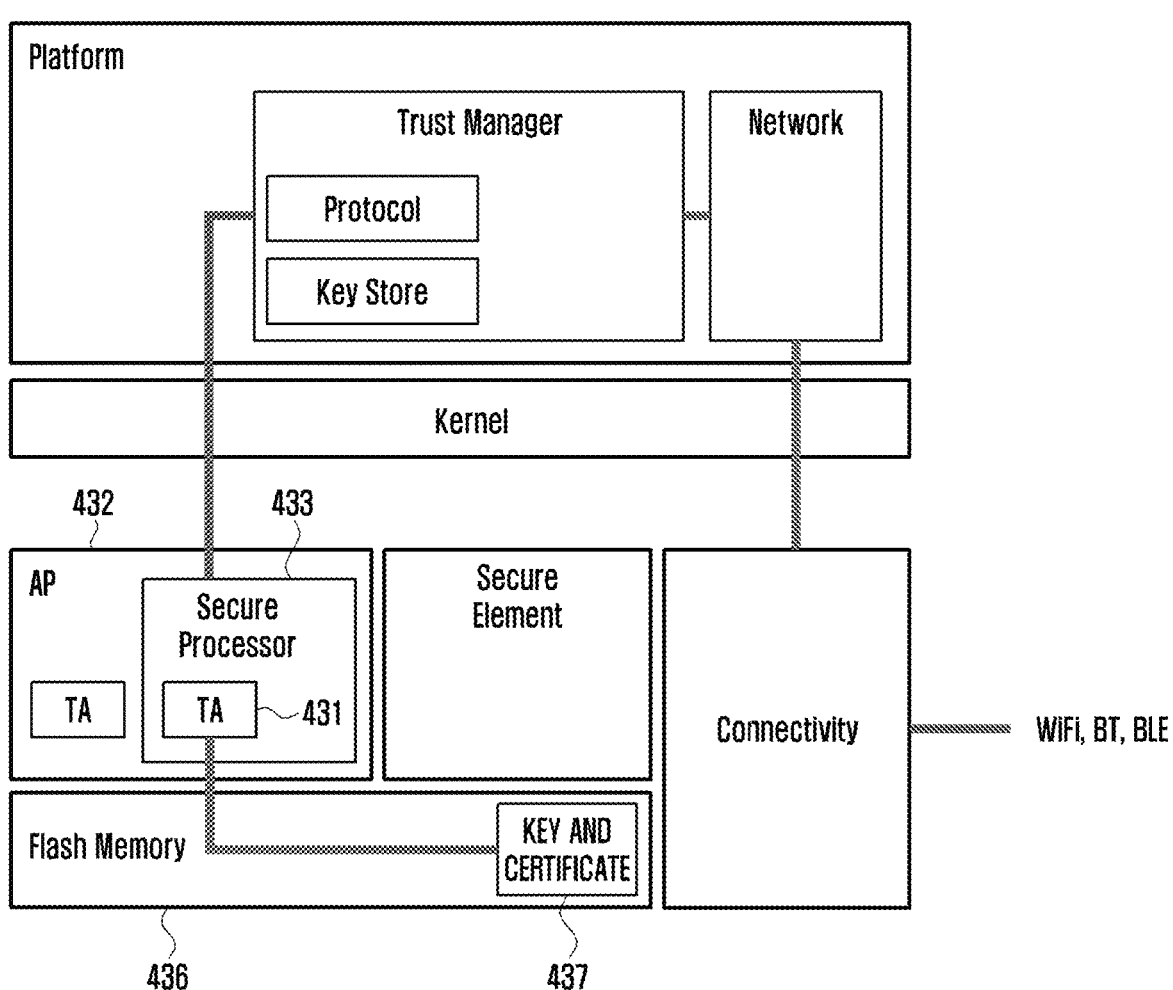

FIG. 4B illustrates an example of executing the trusted application 431 on the secure processor 433 independent from the normal area of the processor 432.

According to an embodiment, the secure processor 433 may be implemented on a secure area independent from the normal area of the processor 432. For example, the secure processor 433 may be packaged inside the processor 432 and may correspond to a secure chip implemented in an area physically separated from the normal area. The secure processor 433 may include a separate CPU and RAM and provide a security level in hardware level therethrough. The secure processor 433 shows a fast performance but may not include a storage (or flash memory), and thus permanent storage of data is impossible and software may be temporarily loaded.

According to an embodiment, the trusted application 431 may be executed on the secure processor 433 and the key and certificate 437 of the trusted application 431 generated on the secure processor 433 may be encrypted on the secure processor 433 and stored in the flash memory 436.

According to the embodiment of FIG. 4B, a protocol for mutual attestation between the electronic device 430 and the external device may be implemented on the secure processor 433 which corresponds to a security-specific chip. In the case of the embodiment, the security in hardware level is implemented and thus the security level of L1 which is the highest level may be provided.

Figure 4C:
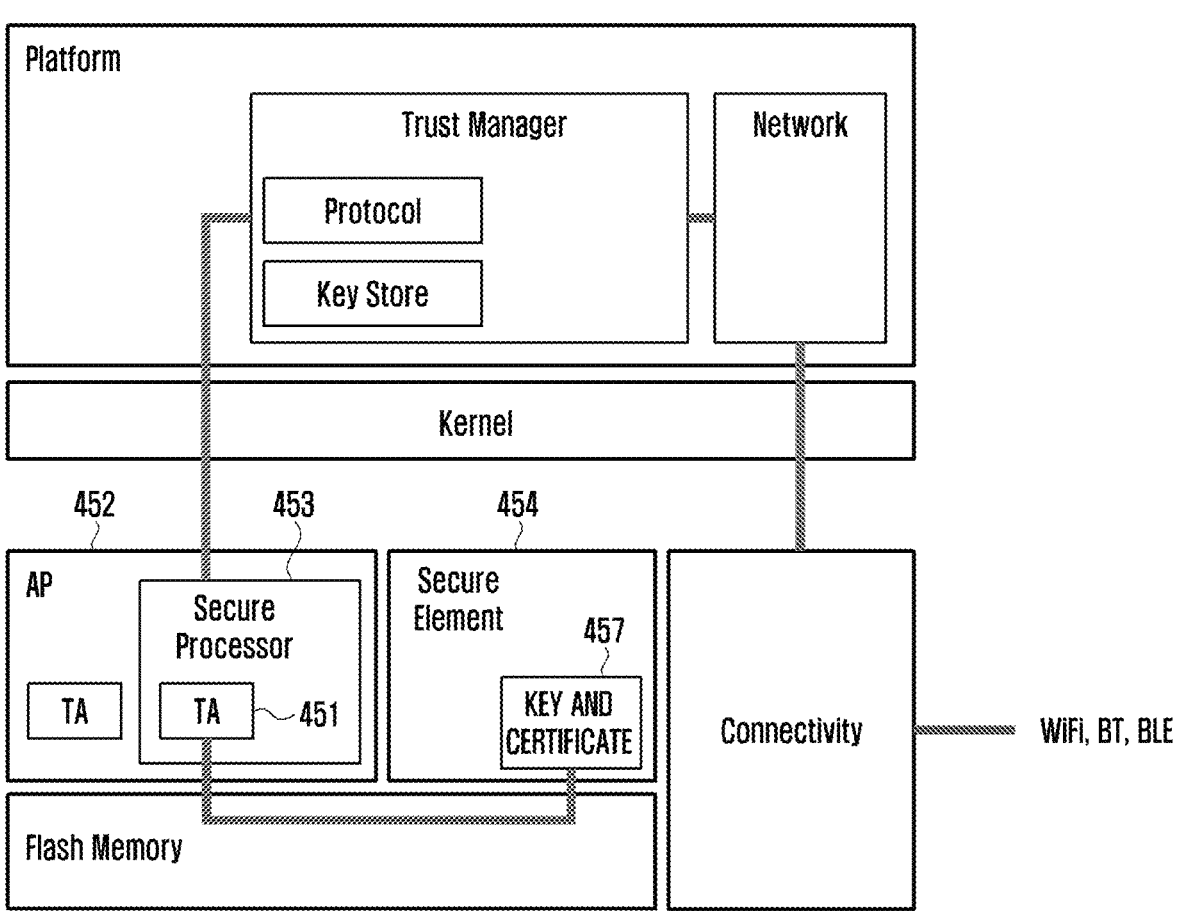

FIG. 4C illustrates an example in which the trusted application 451 is executed on the secure processor 453 independent from the normal area of the processor and the key and certificate 457 is stored on the secure element 454.

According to an embodiment, the secure element 454 may correspond to a secure chip mounted outside the processor 452. The secure element 454 may include an internal processor (or CPU), a volatile memory (e.g., a RAM), and a non-volatile memory, which operate independently from the processor 452.

According to the embodiment of FIG. 4C, a protocol for mutual attestation between the electronic device 450 and the external device may be implemented on the secure processor 453 which corresponds to a security-specific chip. In addition, a key and certificate 457 generated in the trusted application 451 may be encrypted and stored in the non-volatile memory of the secure element 454.

In the case of the embodiment, the security in hardware level is implemented and thus the security level of L1 which is the highest level may be provided. When comparing the embodiment of FIG. 4C with the embodiment of FIG. 4B, since the key and certificate 457 is stored in the storage area of the secure element 454 rather than the flash memory 436, a higher level of security function may be provided.

Figure 4D:
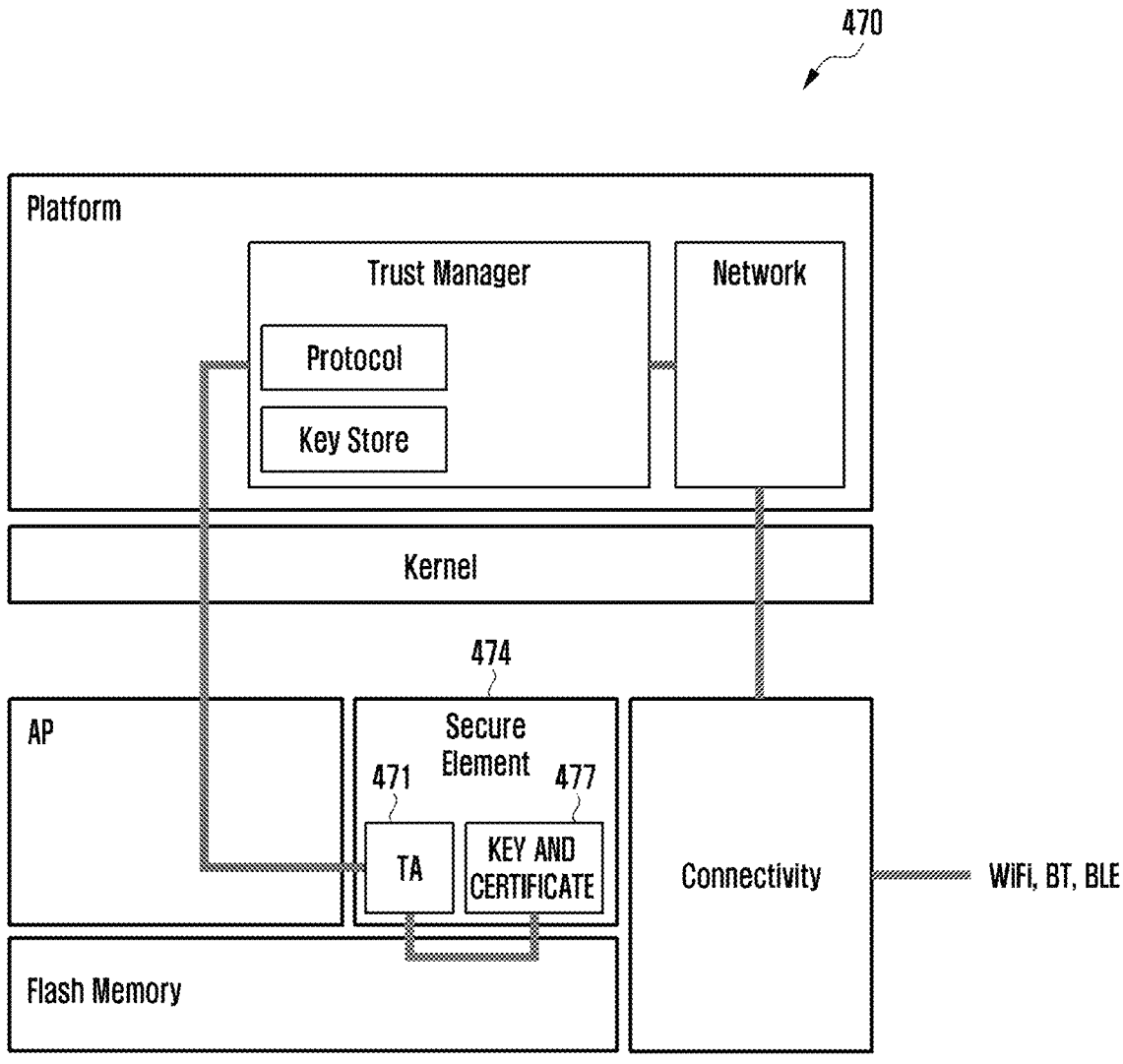

FIG. 4D illustrates an example in which the trusted application 471 is executed on the secure element 474 outside the processor and the key and certificate 477 is stored on the secure element 474.

According to the embodiment of FIG. 4D, a protocol for mutual attestation between the electronic device 470 and the external device may be implemented on the secure element 474 which corresponds to a security-specific chip outside the processor. According to an embodiment, the trusted application 471 may be executed on the secure element 474. In addition, the key and certificate 477 generated in the trusted application 471 may be stored in a storage area of the secure element 474.

In the case of the embodiment, the security in hardware level is implemented as the embodiment of FIG. 4C and thus the security level of L1 which is the highest level may be provided.

According to various embodiments, the electronic device may pre-store, in the non-volatile area of the memory, the security level assigned according to a method (e.g., FIGS. 4A to 4D) for implementing the security environment of the electronic device.

Figure 5:
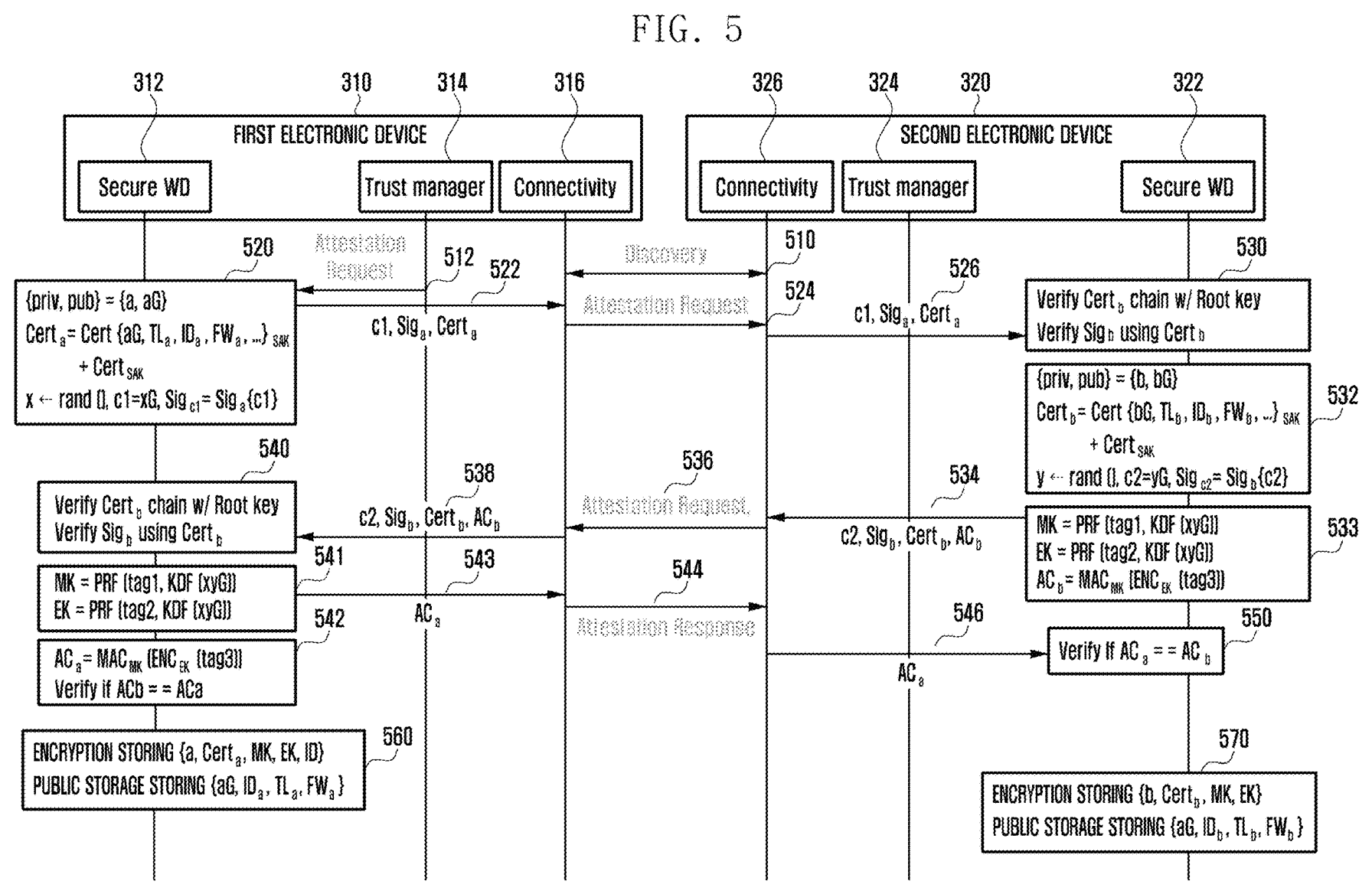

FIG. 5 is a signal flowchart illustrating a protocol for mutual attestation between electronic devices according to an embodiment of the disclosure.

In the following embodiment, respective operations may be sequentially performed, but are not necessarily sequentially performed. For example, the sequential position of each operation may be changed, or at least two operations may be performed in parallel.

The method described herein may be performed by a first electronic device (e.g., the first electronic device 210 in FIG. 2) and a second electronic device (e.g., the second electronic device 220 in FIG. 2), and the first electronic device and the second electronic device may respectively include the configuration and/or function of the electronic device 300 in FIG. 3.

Referring to FIG. 5, the first electronic device 310 may include a first secure module 312, a first trust manager 314 (e.g., the trust manager 422 in FIGS. 4A to 4D), and a first connectivity module 316 (e.g., the connectivity module 418 in FIGS. 4A to 4D). The configuration of the second electronic device 320 may correspond to that of the first electronic device 310 and as described above, the second electronic device 320 may include a second secure module 322, a second trust manager 324, and a second connectivity module 326.

According to an embodiment, the first secure module 312 and the second secure module 322 may respectively include a processor and a storage implemented on a secure area (secure world) of the first electronic device 310 and the second electronic device 320.

According to an embodiment, the first electronic device 310 may include at least one configuration of FIGS. 4A to 4D and the security level (or trust level) (e.g., L1, L2, or L3) of the first electronic device 310 may be determined based on the included configuration. The security level of the first electronic device 310 may be stored in the non-volatile area of the memory (e.g., the memory 370 in FIG. 3) of the first electronic device during the manufacture procedure of the first electronic device 310. The security level of the second electronic device 320 may be stored in substantially the same manner as the security level of the first electronic device 310.

According to an embodiment, an attestation key (e.g., the Samsung attestation key (SAK)) and a root key may be loaded on the secure area during the manufacturing procedure of the first electronic device 310 and the second electronic device 320.

According to an embodiment, the security level of the electronic device (e.g., the first electronic device 310 and the second electronic device 320) may be loaded on the secure module in an unmodifiable form. For example, it may be a state in which software including the security level is code signed and verified with a secure boot chain of the electronic device at a time point of operation. Here, the code signing (or code signature) is a digital signing process to ensure the reliability of the software including the security level and it may be ensured that code signed software is not modified or damaged. Accordingly, when arbitrarily attempting modification of the security level of the electronic device through a software attack, the attack may be filtered out by a secure boot (or trusted boot) chain of the electronic device.

According to an embodiment, when receiving an attestation request from the other device, the first electronic device 310 and the second electronic device 320 may read out the prestored security level and insert same into a newly generated electronic device.

According to an embodiment, in operation 510, the first electronic device 310 and the second electronic device 320 may discover the other device through the first connectivity module 316 and the second connectivity module 326, respectively. For example, the first electronic device 310 and the second electronic device 320 may identify the other device through Wi-Fi or Bluetooth scanning and establish near-field wireless communication connection. When the discovery and the wireless connection establishment are completed, the first electronic device 310 and the second electronic device 320 may initiate a mutual security verification procedure.

According to an embodiment, in operation 512, in case that establishing connection with the second electronic device 320 through the second connectivity module 326, the first trust manager 314 of the first electronic device 310 may transmit an attestation request to the first secure module 312.

According to an embodiment, in operation 520, the first secure module 312 may generate attestation request data required for the device attestation. For example, the first electronic device 310 may generate the first public element, the first electronic signature, and the first certificate.

According to an embodiment, the first secure module 312 perform an integrity check on a software module in the normal area (or normal world), a firmware version of the electronic device, and/or account information of the electronic device.

According to an embodiment, the first secure module 312 may generate a first private key of the first electronic device 310. For example, the first secure module 312 may generate the first private key by using a cryptographically secure random function. Hereinafter, the first private key generated in the first electronic device 310 is defined as "a".

According to an embodiment, the first secure module 312 may generate a first public key corresponding to the first private key. The first secure module 312 may generate the first public key in an elliptic curve cryptography (ECC) manner, and for example, the generated first public key may be aG calculated by combining (or multiplying) the first private key a and an elliptic curve point G. According to another embodiment, the first electronic device 310 may use an encryption method such as the RSA public key system, and in this case, the first electronic device 310 may generate the private key and the public key together.

According to an embodiment, the first secure module 312 may encrypt a key pair {a, aG} of the generated first private key and first public key and store same in the storage.

According to an embodiment, the first secure module 312 may generate a first random number x by using a predetermined secure random function and combine (or multiply) the generated first random number x and an elliptic curve point G to generate a first public element c1 required to generate a session key (or symmetric key). That is, the first public element c1 may be calculated as xG.

According to an embodiment, the first secure module 312 may electrically sign the first public element c1 by using the first private key a to generate the first electronic signature sig_a.

According to an embodiment, the first secure module 312 may generate a first certificate (attestation certificate) cert-a for the generated first public key aG. According to an embodiment, the first certificate cert-a may include the security level of the first electronic device 310. For example, depending on a configuration (e.g., FIGS. 4A to 4D) of the first electronic device 310, the security level (or trust level) of the first electronic device 310 may be determined and the security level may be one of L1, L2, or L3. The security level of the first electronic device 310 may be stored in the non-volatile area of the memory during the manufacture procedure of the electronic device. According to an embodiment, the first certificate cert-a may further include at least one of at least a portion of account information (e.g., an account ID for accessing a service of the manufacturer of the first electronic device 310) of the first electronic device 310, a firmware version FW_a, whether the software has been modified (integrity), a device type (e.g., whether the device has a child node in the IoT system, such as an IoT hub), a list of child nodes (e.g., a list of IoT devices connected to an IoT hub), the security level of the child nodes, or firmware information.

According to an embodiment, in operation 522, the first secure module 312 may transmit, to the first connectivity module 316, the first public element c1, the first electronic signature sig_a, and the first certificate cert_a which are generated in operation 520.

According to an embodiment, in operation 524, the first connectivity module 316 may transmit, to the second electronic device 320, an attestation request including the first public element c1, the first electronic signature sig_a, and the first certificate cert_a through the established near-field wireless communication connection (e.g., Wi-Fi or Bluetooth).

According to an embodiment, in operation 526, the second connectivity module 326 of the second electronic device 320 may receive the attestation request from the first electronic device 310 and transfer the first public element c1, the first electronic signature sig_a, and the first certificate cert_a which are included in the attestation request data to the second secure module 322.

According to an embodiment, in operation 530, the second secure module 322 may verify the first public element c1, the first electronic signature sig_a, and the first certificate cert_a of attestation request data received from the first electronic device 310. The second secure module 322 may verify the first certificate cert_a by using the root key loaded on the second electronic device 320 and verify the first public element c1 and the first electronic signature sig_a by using the first public key aG embedded in cert_a.

According to an embodiment, in operation 532, the second secure module 322 may generate second attestation request data required for the device attestation. For example, the second electronic device 320 may generate the second public element, the second electronic signature, and the second certificate.

According to an embodiment, the second secure module 322 perform an integrity check on a software module in the normal area (or normal world), a firmware version of the second electronic device 320, and/or account information of the second electronic device 320.

According to an embodiment, the second secure module 322 may generate a second private key of the second electronic device 320. For example, the second secure module 322 may generate the second private key by using a cryptographically secure random function. Hereinafter, the second private key generated in the second electronic device 320 is defined as "b".

According to an embodiment, the second secure module 322 may generate a second public key corresponding to the second private key. The second secure module 322 may generate the second public key in an elliptic curve cryptography (ECC) manner, and for example, the generated second public key may be bG calculated by combining (or multiplying) the private key b and an elliptic curve point G. According to another embodiment, the second electronic device 320 may use an encryption method such as the RSA public key system, and in this case, the second electronic device 320 may generate the private key and the public key together.

According to an embodiment, the second secure module 322 may encrypt a key pair {b, bG} of the generated second private key and second public key and store same in the storage.

According to an embodiment, the second secure module 322 may generate a second random number y by using a predetermined secure random function and combine (or multiply) the generated second random number y and an elliptic curve point G to generate a second public element c2 required to generate a session key (or symmetric key). That is, the second public element c2 may be calculated as yG.

According to an embodiment, the second secure module 322 may electrically sign the second public element c2 by using the second private key b to generate the second electronic signature sig_b.

According to an embodiment, the second secure module 322 may generate a second certificate (attestation certificate) cert-b for the generated second public key bG. According to an embodiment, the second certificate cert-b may include the security level of the second electronic device 320. For example, depending on a configuration (e.g., FIGS. 4A to 4D) of the second electronic device 320, the security level (or trust level) of the second electronic device 320 may be determined and the security level may be one of L1, L2, or L3. The security level of the second electronic device 320 may be stored during the manufacture procedure of the second electronic device 320. According to an embodiment, the second certificate cert_b may further include at least one of at least a portion of account information (e.g., an account ID for accessing a service of the manufacturer of the second electronic device 320) of the second electronic device 320, a firmware version FW_a, whether the software has been modified (integrity), a device type (e.g., whether the device has a child node in the IoT system, such as an IoT hub), a list of child nodes (e.g., a list of IoT devices connected to an IoT hub), the security level of the child nodes, or firmware information.

According to an embodiment, in operation 533, the second secure module 322 may generate a second AC value to be used for encryption and integrity identification.

According to an embodiment, the second secure module 322 may combine the second random number y generated using the predetermined secure random function and the first public element c1 (xG) received from the first electronic device 310 to generate a key xyG. The generated key xyG is used for encryption and integrity identification and may be derived and calculated once more by using a key derivation function (KDF) and a pseudo random function (PRF) as shown in Equation 1 and Equation 2.

$$MK = PRF(tag1, KDF(xyG)) \qquad \text{Equation 1}$$

Equation 1 is merely an example to help understanding without limitation thereto and may be modified, applied, or expanded in various manners.

In Equation 1, tag1 may be a predetermined string (e.g., Mac) or a fixed number value and may be publicized.

$$EK = PRF(tag2, KDF(xyG)) \qquad \text{Equation 2}$$

Equation 2 is merely an example to help understanding without limitation thereto and may be modified, applied, or expanded in various manners.

In Equation 2, tag2 may be a predetermined string (e.g., Enc) or a number value and may be publicized.

According to an embodiment the second secure module 322 may calculate an arithmetic complexity (AC) value for identifying the MK and EK as shown in Equation 3.

$$AC\_b = MAC_{MK}(ENC_{EK}(tag3)) \qquad \text{Equation 3}$$

Equation 3 is merely an example to help understanding without limitation thereto and may be modified, applied, or expanded in various manners.

In Equation 3, tag3 may be a predetermined string (e.g., confirm) or a number value and may be publicized.

According to an embodiment, in operation 534, the second secure module 322 may transfer, to the second connectivity module 326, the second public element c2, the second electronic signature sig_b, and the second certificate cert_b, and the second AC value AC_b generated in operation 533.

According to an embodiment, in operation 536, the second connectivity module 326 may transmit, to the first electronic device 310, an attestation request including the second public element c2, the second electronic signature sig_b, and the second certificate cert_b through the established near-field wireless communication connection (e.g., Wi-Fi or Bluetooth).

According to an embodiment, in operation 538, the first connectivity module 316 of the first electronic device 310 may receive the attestation request from the second electronic device 320 and transfer the second public element c2, the second electronic signature sig_b, and the second certificate cert_b which are included in the attestation request data to the first secure module 312.

According to an embodiment, in operation 540, the first secure module 312 may verify the second public element c2, the second electronic signature sig_b, and the second certificate cert_b of the attestation request data received from the second electronic device 320. The first secure module 312 may verify the second certificate cert_b by using the root key loaded on the first electronic device 310 and verify the second electronic signature sig_b of the second public element c2 by using the second public key bG embedded in cert_b.

According to an embodiment, in operation 541, the first secure module 312 may generate a first AC value to be used for encryption and integrity identification.

According to an embodiment, the first secure module 312 may combine the first random number x generated using the predetermined secure random function and the second public element c2 (yG) received from the second electronic device 320 to generate a key xyG. The generated key xyG is used for encryption and integrity identification and may be derived and calculated once more by using a key derivation function (KDF) and a pseudo random function (PRF) as shown in Equation 1 and Equation 2 described above.

According to an embodiment the first secure module 312 may calculate an arithmetic complexity (AC) value for identifying the MK and EK as shown in Equation 3 described above.

According to an embodiment, in operation 542, the first secure module 312 may identify whether the first AC value AC_a calculated in operation 541 and the second AC value AC_b received from the second electronic device 320 are identical to each other.

According to an embodiment, in case that the first AC value AC_a and the second AC value AC_b are identical to each other, in operation 560, the first secure module 312 may encrypt {the first private key a, the first certificate cert_a, MK, EK, and an ID} through a key which may only be accessed in a secure area and store same in the storage. In addition, the first secure module 312 may store {the first public key aG, an ID ID_a of the first electronic device 310, the security level TL_a of the first electronic device 310, and the firmware information FW_a of the first electronic device 310} in a publicized local storage or a verified network storage.

According to an embodiment, in operation 543, the first secure module 312 may transmit the generated first AC value to the first connectivity module 316 and in operation 544, the first connectivity module 316 may transmit the first AC value to the second electronic device 320. In operation 546, the second connectivity module 326 may receive the first AC value from the first electronic device 310 and transmit same to the second secure module 322.

According to an embodiment, in operation 550, the second secure module 322 may identify whether the second AC value AC_b calculated in operation 533 and the first AC value AC_a received from the first electronic device 310 are identical to each other.

According to an embodiment, in case that the first AC value AC_a and the second AC value AC_b are identical to each other, in operation 570, the second secure module 322 may encrypt {the second private key b, the second certificate cert_b, MK, EK, and an ID} through a key which may only be accessed in a secure area and store same in the storage. In addition, the second secure module 322 may store {the second public key bG, an ID ID_b of the second electronic device 320, the security level TL_b of the second electronic device 320, and the firmware information FW_b of the second electronic device 320} in a publicized local storage or a verified network storage.

By using a result acquired executing the protocol described above, the first electronic device 310 and the second electronic device 320 verify the certificate and electronic signature received from the other device by using the root key respectively inserted during the manufacture procedure and thus it may be identified that the electronic devices are manufactured by the same manufacturer. In addition, the first electronic device 310 and the second electronic device 320 may identify that the other device is signed by the key which may only be accessed in a secure area.

According to an embodiment, the first electronic device 310 and the second electronic device 320 may identify the security level of the other device stored in the certificate of the other device. Furthermore, the first electronic device 310 and the second electronic device 320 may further identify at least a portion of the account information, the firmware version, whether software has been modified, the device type, the list of child nodes, the security level of child nodes, and the firmware information stored in the certificate of the other device.

According to an embodiment, in case that the protocol has a problem (e.g., in case that the first AC value and the second AC value are not identical to each other), the protocol may be ended immediately and the first electronic device 310 and the second electronic device 320 may release the connection with the other device and prevent the other device from participating in the network.

According to an embodiment, in case that the protocol execution result verification is completed, the first electronic device 310 and the second electronic device 320 may identify the security level of the other device and store the identified security level in a public storage of which integrity is protected.

According to an embodiment, the first electronic device 310 and the second electronic device 320 may use the security levels of both devices for authority control when a secure service is operated between two devices. For example, in case that the second electronic device 320 is identified to have the security level of L1, the first electronic device 310 may provide an authority to determine addition of membership when configuring the whole network and/or an authority to monitor network security. Alternatively, in case that the second electronic device 320 is identified to have the security level of L2, the first electronic device 310 may provide an authority to the second electronic device 320 in a level of only monitoring the network security.

Figure 6:
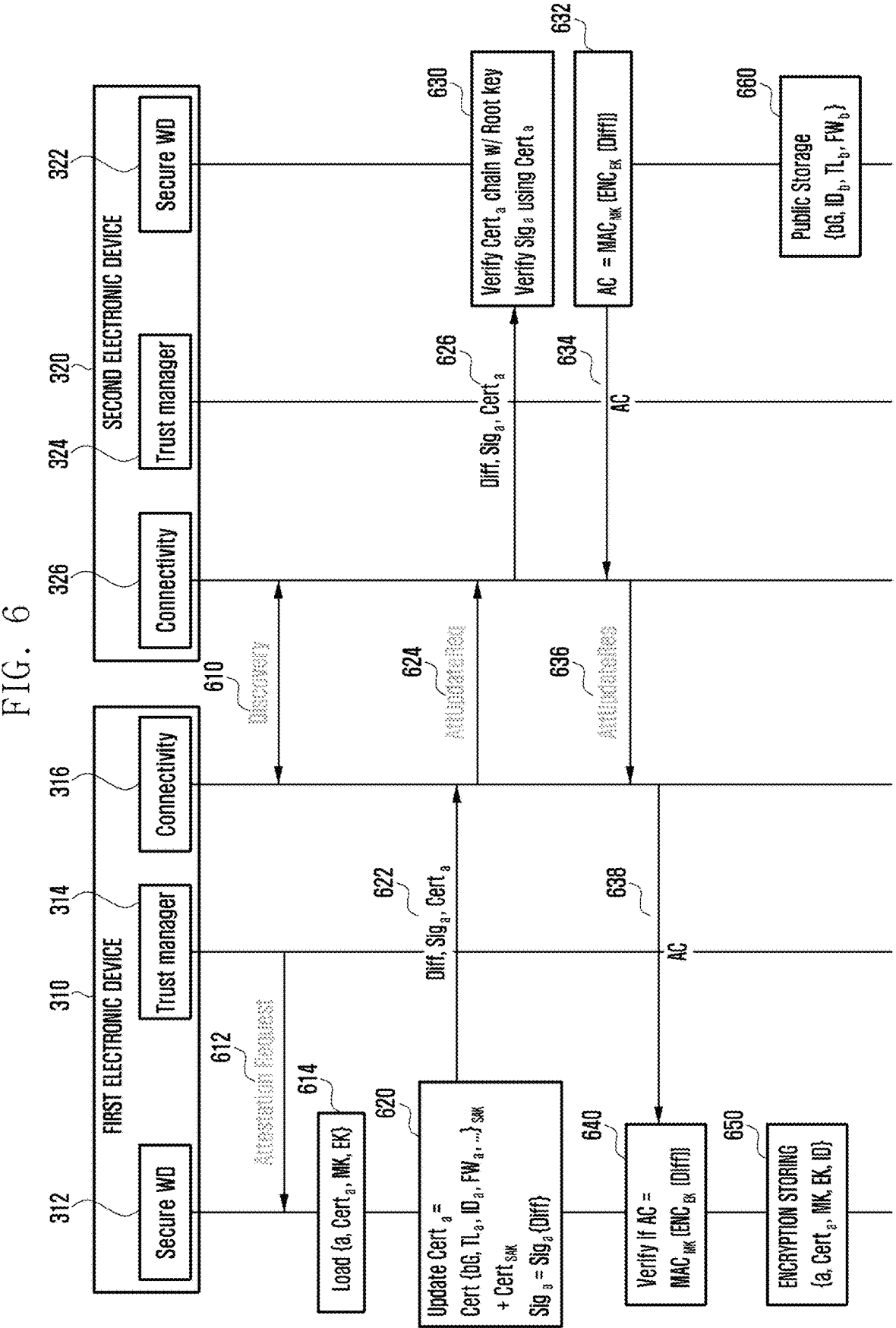
FIG. 6 is a signal flowchart illustrating a protocol for mutual attestation between electronic devices according to an embodiment of the disclosure.

FIG. 6 is a signal flowchart illustrating a protocol for mutual attestation between electronic devices according to an embodiment of the disclosure.

In the following embodiment, respective operations may be sequentially performed, but are not necessarily sequentially performed. For example, the sequential position of each operation may be changed, or at least two operations may be performed in parallel.

FIG. 6 illustrates a method for providing updated information when device information of the first electronic device 310, such as the account information and/or the firmware version, is updated after the device attestation between the first electronic device 310 and the second electronic device 320 is completed through the procedure of FIG. 5.

According to an embodiment, in operation 610, the first electronic device 310 and the second electronic device 320 may discover the other device through the first connectivity module 316 and the second connectivity module 326, respectively.

According to an embodiment, in operation 612, the first trust manager 314 of the first electronic device 310 may transmit an attestation request to the first secure module 312. The first trust manager 314 may transmit the attestation request in case that a change of the device information of the first electronic device 310 is identified.

According to an embodiment, in operation 614, the first secure module 312 may load the first private key a, the first certificate cert_a, MK, and EK stored in the secure area of the storage. The first private key a, the first certificate cert_a, MK, and EK may be encrypted and stored in the secure area of the storage and the first secure module 312 may decrypt the encrypted information.

According to an embodiment, in operation 620, the first secure module 312 may update the first certificate cert_a. For example, the first secure module 312 may change the device information (e.g., the account information or the firmware version) of the first electronic device 310 to changed device information. The first secure module 312 may generate an updated certificate including the second public key bG received from the second electronic device 320, the security level TL_a of the first electronic device 310, and the firmware information FW_a. According to an embodiment, the first secure module 312 may generate the certificate by using an attestation key (e.g., the Samsung attestation key (SEK)) when generating the updated certificate.

According to an embodiment, the first secure module 312 may electrically sign the changed device information by using the first private key a to generate an electronic signature sig_a{diff} of the updated device information.

According to an embodiment, in operation 622, the first secure module 312 may transmit, to the first connectivity module 316, the updated device information diff, the updated electronic signature sig_a, and the updated certificate cert_a.

According to an embodiment, in operation 624, the first connectivity module 316 may transmit, to the second electronic device 320, an attestation update request including the updated device information diff, the updated electronic signature sig_a, and the updated certificate cert_a, through the near-field wireless communication connection.

According to an embodiment, in operation 626, the second connectivity module 326 may transfer, to the second secure module 322, the updated device information diff, the updated electronic signature sig_a, and the updated certificate cert_a included in an attestation update response received from the first electronic device 310.

According to an embodiment, in operation 630, the second secure module 322 may verify the updated electronic signature sig_a and the updated certificate cert_a received from the first electronic device 310. The second secure module 322 may verify the updated certificate cert_a by using the root key loaded on the second electronic device 320 and verify the updated electronic signature sig_a by using a public key bG embedded in cert_a.

According to an embodiment, in operation 632, the second secure module 322 may generate an AC value to be used for encryption and integrity identification. For example, the AC value may be calculated as in Equation 4 below.

$$AC = MAC_{MK}(ENC_{EK}(Diff))$$ 
<div align="right">Equation 4</div>

Equation 4 is merely an example to help understanding without limitation thereto and may be modified, applied, or expanded in various manners.

According to an embodiment, in operation 634, the second secure module 322 may transfer the AC value to the second connectivity module 326. In operation 636, the second connectivity module 326 may transmit an attestation update response including the transferred AC value to the first electronic device 310 through the near-field communication connection.

According to an embodiment, in operation 638, the first connectivity module 316 may transmit the AC value included in the attestation update response received from the second electronic device 320 to the first secure module 312.

According to an embodiment, in operation 640, an AC value is calculated and it may be identified that the AC value is identical to the AC value received from the second electronic device 320.

According to an embodiment, in operation 650, the first secure module 312 may encrypt {the first private key a, the first certificate cert_a, MK, EK, and the ID} through a key which may only be accessed in a secure area and store same in the storage.

According to an embodiment, in operation 660, the second secure module 322 may store {the second public key bG, the ID ID_b of the second electronic device 320, the security level TL_b of the second electronic device 320, and the firmware information FW_b of the second electronic device 320} in a publicized local storage or a verified network storage.

For the mutual attestation of the first electronic device 310 and the second electronic device 320, in the case of using a server-client-based attestation, two procedures may be required for attesting the first electronic device and the second electronic device on the server, and compared with this, the embodiments of the disclosure may more efficiently implement a communication round. In addition, the embodiments of the disclosure may remove an additional communication round by combining and sending attestation and a key sharing message for communication efficiency. Furthermore, the embodiments of the disclosure may classify nodes having various security capacities for each security level, attest same, and assign an authority appropriate to the security level.

Figure 7:
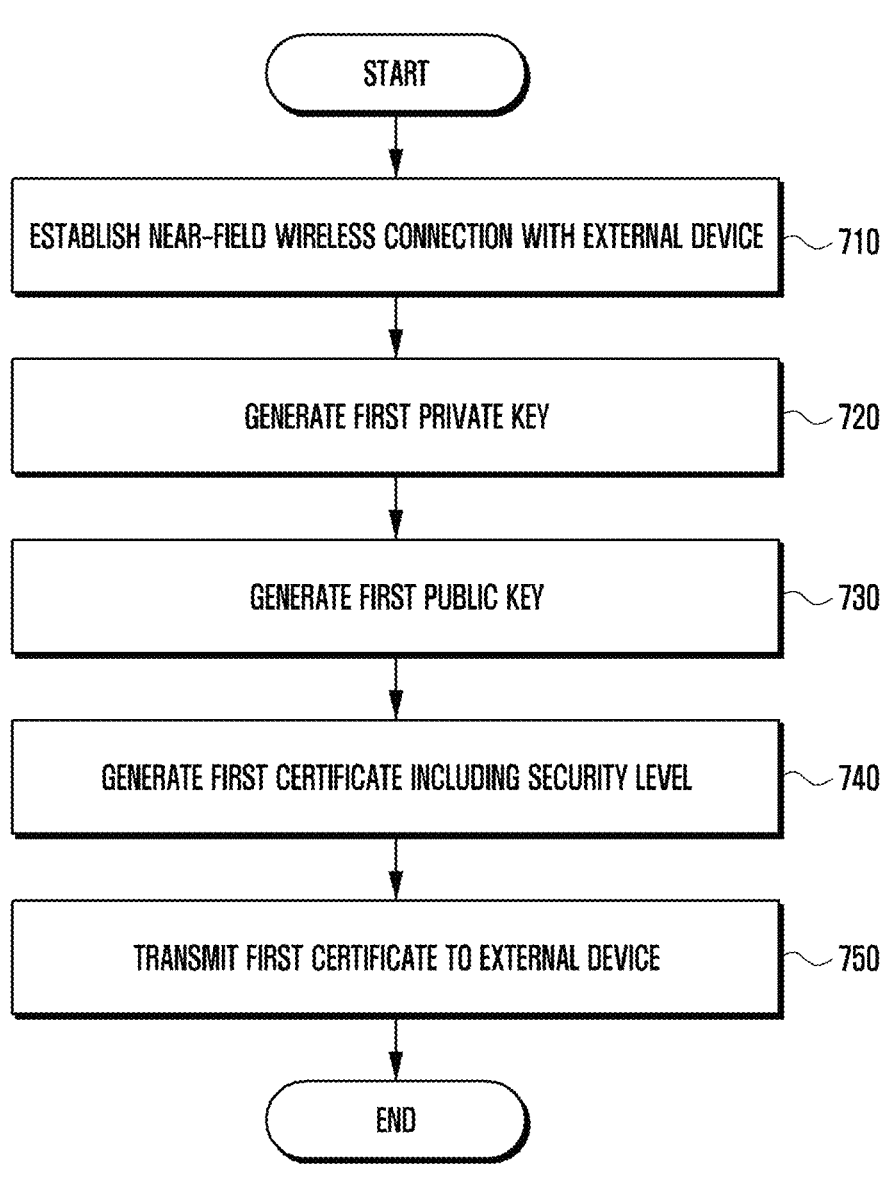
FIG. 7 is a flowchart of a method of an electronic device for mutually attesting security levels of an external device according to an embodiment of the disclosure.

FIG. 7 is a flowchart of a method of an electronic device for mutually attesting security levels of an external device according to an embodiment of the disclosure.

In the following embodiment, respective operations may be sequentially performed, but are not necessarily sequentially performed. For example, the sequential position of each operation may be changed, or at least two operations may be performed in parallel.

A method to be described may be performed by an electronic device (e.g., the first electronic device 210 or the second electronic device 220 in FIG. 2, or the electronic device 300 in FIG. 3), and the description of the technical features that have been described will be omitted below.

According to an embodiment, in operation 710, the electronic device (e.g., the first electronic device 210 in FIG. 2)

may establish near-field wireless communication connection with an external device (e.g., the second electronic device 220 in FIG. 2). For example, the electronic device and the external device may support near-field wireless communication, such as Wi-Fi, Bluetooth, or Bluetooth low energy (BLE), and the near-field wireless communication connection with the external device may be established through a communication module. In case that the near-field wireless communication connection between the electronic device and the external device is established, a process for the mutual attestation may be performed.

According to an embodiment, in operation 720, the electronic device may generate a first private key by using a determined random function. For example, the electronic device may generate the first private key by using a cryptographically secure random function.

According to an embodiment, in operation 730, the electronic device may generate a first public key based on the first private key. According to an embodiment, the electronic device may generate the first public key in an elliptic curve cryptography (ECC) manner, and for example, the generated first public key may be a value calculated by combining (or multiplying) the private key and an elliptic curve point. According to an embodiment, the electronic device may encrypt a key pair of the first private key and first public key, and store same in a non-volatile area of the memory (e.g., the memory 370 in FIG. 3).

According to an embodiment, in operation 740, the electronic device may generate a first certificate for the first public key including the security level of the electronic device. According to an embodiment, the first certificate may include at least a portion of the security level, account information, firmware version, software modification, device type, or list of child nodes of the electronic device 300. According to an embodiment, the electronic device may generate a first random number by using a predetermined secure random function and generate a first public element from the first random number by using an encryption algorithm. In addition, the electronic device may electrically sign the first public element by using the first private key to generate a first electronic signature.

According to an embodiment, in operation 750, the electronic device may transmit the generated first certificate to the external device. The electronic device may transmit an attestation request including the first certificate to the external device through the established near-field wireless communication connection with the external device. According to an embodiment, the attestation request transmitted from the electronic device may further include the first public element and the first electronic signature generated earlier.

According to an embodiment, the electronic device may receive a second public element, a second electronic signature, and a second certificate generated from the external device. The electronic device may verify the second certificate by using a root key stored in the memory and verify the second electronic signature by using the second public key embedded in the second certificate. Through the attestation procedure, the electronic device may identify the security level of the external device and provide an authority to the external device on a network based on the security level. For example, in case that the external device is identified to have the security level of L1, there may be provided an authority to determine addition of membership when configuring the network including the electronic device 300 and the external device and an authority to monitor network security. In case that the external device is identified to have the security level of L2, the external device may be provided with an authority to that allows only monitoring of network security.

The electronic device according to various embodiments of the disclosure may include a communication module for supporting near-field wireless communication, memory, and at least one processor operatively connected to the communication module and the memory. According to various embodiments, the memory stores one or more programs including instructions that, when executed by the at least one processor, may cause the electronic device to establish near-field wireless communication connection with an external device through the communication module, generate a first private key by using a determined random function, generate a first public key based on the first private key, generate a first certificate including a security level of the electronic device with respect to the first public key, and transmit the generated first certificate to the external device through the communication module.

According to various embodiments, the security level of the electronic device may be determined based on at least one of a hardware configuration for executing a trusted application, or an attestation key of the electronic device and a storage location of a certificate for the attestation key.

According to various embodiments, in case that the trusted application is executed on security-specific hardware configured inside or outside the at least one processor, the security level of the electronic device may be determined as a first level, and in case that the trusted application is executed on a partial area of the at least one processor, the security level of the electronic device may be determined as a second level lower than the first level.

According to various embodiments, the first certificate may include at least one of at least a portion of account information, a firmware version, whether software has been modified, a device type, or a list of child nodes of the electronic device.

According to various embodiments, the one or more programs further include instructions that, when executed by the at least one processor, may cause the electronic device to generate a first random number by using a determined random function, generate a first public element from the first random number by using an encryption algorithm, electrically sign the first public element by using the first private key to generate a first electronic signature, and transmit the first public element, the first electronic signature, and the first certificate to the external device through the communication module.

According to various embodiments, the one or more programs further include instructions that, when executed by the at least one processor, may cause the electronic device to receive a second public element, a second electronic signature, and a second certificate from the external device through the communication module, verify the second certificate by using a prestored root key, and verify the second electronic signature by using a second public key included in the second certificate.

According to various embodiments, the one or more programs further include instructions that, when executed by the at least one processor, may cause the electronic device to identify a security level of the external device included in the second certificate.

According to various embodiments, the one or more programs further include instructions that, when executed by the at least one processor, may cause the electronic device to provide an authority of the external device on a network including the electronic device and the external device, based on the identified security level of the external device.

According to various embodiments, the one or more programs further include instructions that, when executed by the at least one processor, may cause the electronic device to store the identified security level of the external device in a public area of the memory.

A method, performed by an electronic device, to mutually attest a security level of an external device according to various embodiments of the disclosure may include an operation of establishing near-field wireless communication connection with the external device, an operation of generating a first private key by using a determined random function, an operation of generating a first public key based on the first private key, an operation of generating a first certificate including a security level of the electronic device with respect to the first public key, and an operation of transmitting the generated first certificate to the external device.

According to various embodiments, the security level of the electronic device may be determined based on at least one of a hardware configuration for executing a trusted application, or an attestation key of the electronic device and a storage location of a certificate for the attestation key.

According to various embodiments, in case that the trusted application is executed on security-specific hardware configured inside or outside at least one processor of the electronic device, the security level of the electronic device may be determined as a first level, and in case that the trusted application is executed on a partial area of the at least one processor, the security level of the electronic device may be determined as a second level lower than the first level.

According to various embodiments, the first certificate may include at least one of at least a portion of account information, a firmware version, whether software has been modified, a device type, or a list of child nodes of the electronic device.

According to various embodiments, the method may further include an operation of generating a first random number by using a determined random function, an operation of generating a first public element from the first random number by using an encryption algorithm, an operation of electrically signing the first public element by using the first private key to generate a first electronic signature, and an operation of transmitting the first public element, the first electronic signature, and the first certificate to the external device.

According to various embodiments, the method may further include an operation of receiving a second public element, a second electronic signature, and a second certificate from the external device, an operation of verifying the second certificate by using a prestored root key, and an operation of verifying the second electronic signature by using a second public key included in the second certificate.

According to various embodiments, the method may further include an operation of identifying a security level of the external device included in the second certificate.

According to various embodiments, the method may further include an operation of providing an authority of the external device on a network including the electronic device and the external device, based on the identified security level of the external device.

According to various embodiments, the method may further include an operation of storing the identified security level of the external device in a public area of memory of the electronic device.

One or more non-transitory computer-readable storage media storing one or more programs including instructions that, when executed by at least one processor of an electronic device, according to various embodiments of the disclosure may cause the electronic device to perform operations. According to various embodiments, the operations may include establishing near-field wireless communication connection with an external device, generating a first private key by using a determined random function, generating a first public key based on the first private key, generating a first certificate including a security level of the electronic device with respect to the first public key, and transmitting the generated first certificate to the external device.

According to various embodiments, the security level of the electronic device may be determined based on at least one of a hardware configuration configured to execute a trusted application, or an attestation key of the electronic device and a storage location of a certificate for the attestation key.

According to various embodiments, in case that the trusted application is executed on security-specific hardware configured inside or outside the at least one processor, the security level of the electronic device may be determined as a first level. According to various embodiments, in case that the trusted application is executed on a partial area of the at least one processor, the security level of the electronic device may be determined as a second level lower than the first level.

According to various embodiments, the first certificate further includes at least one of at least a portion of account information, a firmware version, whether software has been modified, a device type, or a list of child nodes of the electronic device.

According to various embodiments, the operations may further include generating a first random number by using a determined random function, generating a first public element from the first random number by using an encryption algorithm, electrically signing the first public element by using the first private key to generate a first electronic signature, and transmitting the first public element, the first electronic signature, and the first certificate to the external device.

According to various embodiments, the operations may further include receiving a second public element, a second electronic signature, and a second certificate from the external device, verifying the second certificate by using a prestored root key, and verifying the second electronic signature by using a second public key included in the second certificate.

According to various embodiments, the operations may further include identifying a security level of the external device included in the second certificate.

According to various embodiments, the operations may further include providing an authority of the external device on a network including the electronic device and the external device, based on the identified security level of the external device.

According to various embodiments, the operations may further include storing the identified security level of the external device in a public area of memory of the electronic device.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuitry configured to support near-field wireless communication;

memory; and at least one processor operatively connected to the communication circuitry and the memory, wherein the memory stores one or more programs including instructions that, when executed by the at least one processor, cause the electronic device to:

determine a security level of the electronic device based on a hardware element for executing a trusted application generating a private key, a public key and a certificate with respect to the public key, and a location where the private key, the public key and the certificate are stored, establish near-field wireless communication connection with an external device through the communication circuitry, execute the trusted application to generate a first private key by using a determined random function, a first public key based on the first private key and, a first certificate with respect to the first public key, the first certificate being configured to include the determined security level of the electronic device, and transmit the generated first certificate to the external device through the communication circuitry such that the external device authenticates the electronic device using the generated first certificate.

2. The electronic device of claim 1, wherein the hardware element of the electronic device comprises at least one of a processor, a secure processor inside the processor or a secure element outside the processor, the secure element including an independent processor and an independent memory, wherein in case that the trusted application is executed on the secure processor or the secure element, the security level of the electronic device is determined as a first level, and wherein in case that the trusted application is executed on the processor, the security level of the electronic device is determined as a second level lower than the first level.

3. The electronic device of claim 1, wherein the first certificate further includes at least one of at least a portion of account information, a firmware version, whether software has been modified, a device type, or a list of child nodes of the electronic device, wherein the child nodes are end devices connected to a network via the electronic device acting as a hub.

4. The electronic device of claim 1, wherein the one or more programs further include instructions that, when executed by the at least one processor, cause the electronic device to:

generate a first random number by using a determined random function;

generate a first public element from the first random number by using an encryption algorithm;

electrically sign the first public element by using the first private key to generate a first electronic signature; and transmit the first public element, the first electronic signature, and the first certificate to the external device through the communication circuitry.

5. The electronic device of claim 1, wherein the one or more programs further include instructions that, when executed by the at least one processor, cause the electronic device to:

receive a second public element, a second electronic signature, and a second certificate from the external device through the communication circuitry;

verify the second certificate by using a prestored root key; and verify the second electronic signature by using a second public key included in the second certificate.

6. The electronic device of claim 5, wherein the one or more programs further include instructions that, when executed by the at least one processor, cause the electronic device to identify a security level of the external device included in the second certificate.

7. The electronic device of claim 6, wherein the one or more programs further include instructions that, when executed by the at least one processor, cause the electronic device to provide an authority of the external device on a network including the electronic device and the external device, based on the identified security level of the external device.

8. The electronic device of claim 6, wherein the one or more programs further include instructions that, when executed by the at least one processor, cause the electronic device to store the identified security level of the external device in a public area of the memory.

9. A method, performed by an electronic device, to mutually attest a security level of an external device, the method comprising:

determining a security level of the electronic device based on a hardware element for executing a trusted application generating a private key, a public key and a certificate with respect to the public key, and a location where the private key, the public key and the certificate are stored;

establishing near-field wireless communication connection with the external device;

executing the trusted application to generate a first private key by using a determined random function;

a first public key based on the first private key and a first certificate with respect to the first public key, the first certificate being configured to include the determined security level of the electronic device; and transmitting the generated first certificate to the external device such that the external device authenticates the electronic device using the generated first certificate.

10. The method of claim 9, wherein the hardware element of the electronic device comprises at least one of a processor, a secure processor inside the processor or a secure element outside the processor, the secure element including an independent processor and an independent memory, wherein in case that the trusted application is executed on the secure processor or the secure element, the security level of the electronic device is determined as a first level, and wherein in case that the trusted application is executed on the processor, the security level of the electronic device is determined as a second level lower than the first level.

11. The method of claim 9, wherein the first certificate further includes at least one of at least a portion of account information, a firmware version, whether software has been modified, a device type, or a list of child nodes of the electronic device, wherein the child nodes are end devices connected to a network via the electronic device acting as a hub.

12. The method of claim 9, further comprising:

generating a first random number by using a determined random function;

generating a first public element from the first random number by using an encryption algorithm;

electrically signing the first public element by using the first private key to generate a first electronic signature; and transmitting the first public element, the first electronic signature, and the first certificate to the external device.

13. The method of claim 9, further comprising:

receiving a second public element, a second electronic signature, and a second certificate from the external device;

verifying the second certificate by using a prestored root key; and verifying the second electronic signature by using a second public key included in the second certificate.

14. The method of claim 13, further comprising:

identifying a security level of the external device included in the second certificate.

15. The method of claim 14, further comprising:

providing an authority of the external device on a network including the electronic device and the external device, based on the identified security level of the external device.

16. The method of claim 14, further comprising:

storing the identified security level of the external device in a public area of memory of the electronic device.

17. One or more non-transitory computer-readable storage media storing one or more programs including instructions that, when executed by at least one processor of an electronic device, cause the electronic device to perform operations, the operations comprising:

determining a security level of the electronic device based on a hardware element for executing a trusted application generating a private key, a public key and a certificate with respect to the public key, and a location where the private key, the public key and the certificate are stored;

establishing near-field wireless communication connection with an external device;

executing the trusted application to generate a first private key by using a determined random function;

a first public key based on the first private key and a first certificate with respect to the first public key, the first certificate being configured to include the determined security level of the electronic device; and transmitting the generated first certificate to the external device such that the external device authenticates the electronic device using the generated first certificate.

* * * * *